United States Patent
Willoughby et al.

(10) Patent No.: US 10,184,577 B2
(45) Date of Patent: Jan. 22, 2019

(54) CARTRIDGE STYLE BALL CHECK FOR POSITIVE DISPLACEMENT PUMP

(71) Applicant: Graco Minnesota Inc., Minneapolis, MN (US)

(72) Inventors: Jason J. Willoughby, Minneapolis, MN (US); David M. Behrens, Hopkins, MN (US)

(73) Assignee: Graco Minnesota, Inc., Minneapolis, MN (US)

( * ) Notice: Subject to any disclaimer, the term of this patent is extended or adjusted under 35 U.S.C. 154(b) by 43 days.

(21) Appl. No.: 15/486,634

(22) Filed: Apr. 13, 2017

(65) Prior Publication Data
US 2017/0219107 A1 Aug. 3, 2017

Related U.S. Application Data

(63) Continuation of application No. PCT/US2016/023406, filed on Mar. 21, 2016.
(Continued)

(51) Int. Cl.
*F16K 15/04* (2006.01)
*F04B 15/02* (2006.01)
(Continued)

(52) U.S. Cl.
CPC ............ *F16K 15/044* (2013.01); *F04B 15/02* (2013.01); *F04B 43/02* (2013.01); *F04B 53/1002* (2013.01)

(58) Field of Classification Search
CPC .................................................. F16K 15/044
(Continued)

(56) References Cited

U.S. PATENT DOCUMENTS 2,306,012 A * 12/1942 Campbell ............. F16K 15/042
137/512
3,596,940 A * 8/1971 Horwitt ..................... F16B 9/02
24/694
(Continued)

FOREIGN PATENT DOCUMENTS

| CN | 2596139 Y | 12/2003 |
| CN | 200989478 Y | 12/2007 |
| EP | 1333206 A1 | 8/2003 |

OTHER PUBLICATIONS

International Search Report and Written Opinion for PCT Application No. PCT/US2016/023406, dated Jun. 27, 2016, 13 pages.
(Continued)

*Primary Examiner* — Marina Tietjen
*Assistant Examiner* — Paul J Gray
(74) *Attorney, Agent, or Firm* — Kinney & Lange, P.A.

(57) ABSTRACT

A check valve assembly includes a housing extending axially along a center axis of the check valve assembly from a first end to a second end. The housing can include an opening disposed at the first end and an outlet disposed at the second end. A seat is disposed in the opening and connected to the tubular housing. The seat includes an inlet extending axially through the seat. A ball is disposed inside the tubular housing and disposed axially between the seat and the outlet. The ball is larger in diameter than the inlet. A ball guide is disposed inside the tubular housing and is disposed axially between the ball and the outlet. A spring is disposed inside the tubular housing and disposed axially between the ball guide and the outlet. The spring is compressed between the ball guide and the outlet.

17 Claims, 2 Drawing Sheets

Related U.S. Application Data

(60) Provisional application No. 62/154,217, filed on Apr. 29, 2015.

(51) Int. Cl.
*F04B 43/02* (2006.01)
*F04B 53/10* (2006.01)

(58) Field of Classification Search
USPC .......... 137/539, 539.5, 543.19; 403/360, 375
See application file for complete search history.

(56) References Cited

U.S. PATENT DOCUMENTS

| | | | | |
|---|---|---|---|---|
| 4,474,208 A | * | 10/1984 | Looney | ............... F16K 17/0406 |
| | | | | 137/516.29 |
| 5,107,890 A | * | 4/1992 | Gute | ..................... F16K 15/044 |
| | | | | 137/539 |
| 5,593,292 A | | 1/1997 | Ivey | |
| 5,813,841 A | | 9/1998 | Sturman | |
| 7,147,002 B2 | * | 12/2006 | Reilly | .................... F16K 15/044 |
| | | | | 137/539.5 |
| 2005/0257927 A1 | | 11/2005 | Coyes et al. | |
| 2008/0041468 A1 | * | 2/2008 | Yoshihiro | ........... F16L 37/0985 |
| | | | | 137/614.21 |
| 2009/0050043 A1 | * | 2/2009 | Alvarez | ................. F16K 24/04 |
| | | | | 114/197 |
| 2010/0038384 A1 | | 2/2010 | Wallace et al. | |
| 2011/0147016 A1 | * | 6/2011 | Blease | ................... A62C 35/68 |
| | | | | 169/17 |
| 2012/0180884 A1 | * | 7/2012 | Brunello | ............... B01F 5/0646 |
| | | | | 137/561 R |

OTHER PUBLICATIONS

First Office Action from Chinese Patent Application No. 201680023127.2, dated Sep. 6, 2018, 15 pages.

* cited by examiner

CARTRIDGE STYLE BALL CHECK FOR POSITIVE DISPLACEMENT PUMP

CROSS REFERENCE TO RELATED APPLICATIONS

This application claims priority to PCT Application No. PCT/US2016/023406 filed on Mar. 21, 2016, which claims benefit of Provisional Application No. 62/154,217 filed on Apr. 29, 2015 and entitled "CARTRIDGE STYLE BALL CHECK FOR POSITIVE DISPLACEMENT PUMP," the disclosure of which is incorporated by reference in its entirety.

BACKGROUND

The present disclosure relates generally to fluid dispensing systems. More specifically, this disclosure relates to positive displacement pumps for fluid dispensing systems.

Fluid dispensing systems, such as fluid dispensing systems for paint, typically utilize positive displacement pumps to pull the fluid from a container and to drive the fluid downstream. Typically, positive displacement pumps contain a check valve in the pump inlet. During operation, the check valve in the pump inlet opens to allow the fluid into the pump and then closes as the pump pressurizes the fluid in the pump chamber and moves the fluid to the pump outlet. In some cases, a check valve can also be included in the pump outlet to prevent the fluid from flowing back into the positive displacement pump between pump intervals.

After each use of the positive displacement pump, the check valves must be flushed (i.e. rinsed and cleaned by flowing water or another solvent through the check valves) to remove old fluid so that the old fluid does not contaminate new fluid in future uses of the positive displacement pump. Flushing the old fluid out of the check valves is especially important when the positive displacement pump is used in applying paint as the old paint can contaminate the color and texture of the new paint. Internal components and seals inside the check valves can create tight spaces and corners inside the check valve that are difficult to clean when flushing the check valves.

SUMMARY

In one aspect of the invention, a check valve assembly includes a housing extending axially along a center axis of the check valve assembly from a first end to a second end. The housing can include an opening disposed at the first end and an outlet disposed at the second end. A seat is disposed in the opening and connected to the tubular housing. The seat includes an inlet extending axially through the seat. A ball is disposed inside the tubular housing and disposed axially between the seat and the outlet. The ball is larger in diameter than the inlet. A ball guide is disposed inside the tubular housing and is disposed axially between the ball and the outlet. A spring is disposed inside the tubular housing and disposed axially between the ball guide and the outlet. The spring is compressed between the ball guide and the outlet.

In another aspect of the invention, a check valve assembly includes a tubular housing extending axially along a center axis of the check valve assembly from a first end to a second end. The tubular housing includes a substantially uniform outer diameter from the first end to the second end of the tubular housing. An opening is disposed at the first end and an outlet is disposed at the second end. The outlet is smaller in diameter than the opening. A seat is disposed in the opening and is connected to the tubular housing. The seat includes an inlet extending axially through the seat. A ball is disposed inside the tubular housing and is disposed axially between the seat and the outlet. The ball is larger in diameter than the inlet. A spring is disposed inside the tubular housing and is disposed axially between the ball and the outlet.

In another aspect of the invention, a check valve assembly includes a tubular housing extending axially along a center axis of the check valve assembly from a first end to a second end. The tubular housing includes an opening disposed at the first end and an outlet disposed at the second end. A seat is disposed in the opening and connected to the tubular housing. The seat includes a first side disposed axially opposite a second side. An inlet extends axially through the seat. A ball is disposed inside the tubular housing and is disposed axially between the second side of the seat and the outlet. The ball is larger in diameter than the inlet. A ball guide is disposed inside the tubular housing and is disposed axially between the ball and the outlet. A spring is disposed inside the tubular housing and is disposed axially between the ball guide and the outlet. The spring is compressed between the ball guide and the outlet. A first seal is disposed on the first side of the seat. A second seal is disposed on the second end of the tubular housing. The tubular housing includes a uniform outer diameter from the first end of the tubular housing to the second seal.

Persons of ordinary skill in the art will recognize that other aspects and embodiments of the present invention are possible in view of the entirety of the present disclosure, including the accompanying figures.

Figure 1:
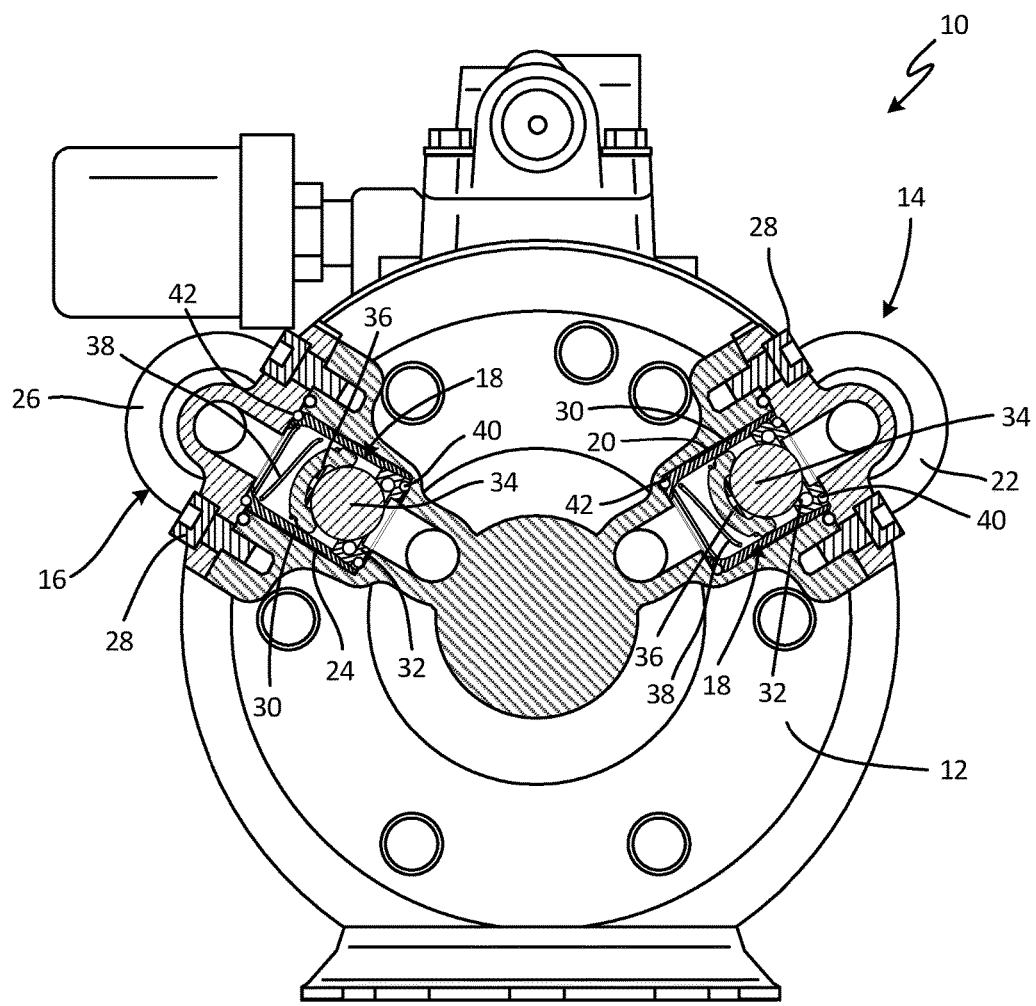
FIG. 1 is a partial cross-sectional view of a positive displacement pump with at least one check valve assembly.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The invention relates to a check valve assembly, and more specifically, to a check valve assembly that includes a tubular housing. As discussed below with reference to the figures, the tubular housing of the check valve assembly contains the components of the check valve assembly into a single capsule that can be assembled into a pump or other fluid dispensing system faster than prior art check valve assemblies. The capsule configuration of the check valve assembly of the instant invention also allows fast, single-part removal of the check valve assembly from the pump or fluid system in the event of repair or replacement of the check valve assembly. The capsule configuration of the check valve assembly lowers the chance of improper installation of the check valve assembly onto the pump in comparison to prior art check valve assemblies where multiple parts of the prior art check valve assembly are assembled one at a time in separate steps into a pump. The capsule configuration of the check valve assembly also allows the check valve assembly to be used in pump inlets or to be reversed and used in pump outlets.

FIG. 1 is a partial cross-sectional view of pump 10. As shown in FIG. 1, pump 10 includes fluid cover housing 12, pump inlet 14, pump outlet 16, and at least one check valve assembly 18. Pump 10 can be part of a larger fluid dispensing system (not shown) for moving a variety of fluids, such as paint, coatings, and lubricants. Pump inlet 14 includes pump inlet bore 20 and pump inlet manifold 22. Pump outlet 16 includes pump outlet bore 24 and pump outlet manifold 26. Pump 10 also includes fasteners 28. Check valve assembly 18 includes housing 30, valve seat 32, ball 34, ball guide 36, spring 38, first seal 40, and second seal 42.

Pump 10 can be a positive displacement pump, such as a diaphragm pump or a reciprocating piston pump. Pump inlet bore 20 can be formed on fluid cover housing 12 and can enlarge the diameter of pump inlet 14 to accommodate first check valve assembly 18. Pump inlet manifold 22 is connected to fluid cover housing 12 by fasteners 28 and is positioned over pump inlet bore 20 and the first check valve assembly 18 to retain the first check valve assembly 18 within the pump inlet bore 20. As shown in FIG. 1, housing 30 and valve seat 32 of the first check valve assembly 18 house and contain ball 34, ball guide 36, and spring 38. First seal 40 is disposed on valve seat 32 and positioned between valve seat 32 and pump inlet manifold 22. First seal 40 can help block fluid passing through pump inlet 14 from leaking between pump inlet manifold 22 and valve seat 32 and leaking around the first check valve assembly 18 between housing 30 and pump inlet bore 20. Second seal 42 can be disposed on housing 30 and can be compressed between housing 30 and pump inlet bore 20 when the first check valve assembly 18 is disposed in pump inlet bore 20. Similar to first seal 40, second seal 42 can help block fluid passing through pump inlet 14 from leaking around the first check valve assembly 18 between housing 30 and pump inlet bore 20. Preventing fluid from leaking out of the main fluid flow of pump inlet 14 ensures that the pump displaces the proper amount of fluid per stoke. Maximizing the amount of fluid displaced per stroke across pump inlet 14 and the first check valve assembly 18 increases the efficiency of pump 10.

Pump outlet bore 24 can be formed on fluid cover housing 12 and can enlarge the diameter of a portion of pump outlet 16 to receive and accommodate a second check valve assembly 18. Pump outlet manifold 26 is connected to fluid cover housing 12 by fasteners 28 and is positioned over pump outlet bore 24 and the second check valve assembly 18 to retain the second check valve assembly 18 within pump outlet bore 24. As shown in FIG. 1, the second check valve assembly 18 is identical to the first check valve assembly 18, however, the orientation of the second check valve assembly 18 is reversed from the orientation of the first check valve assembly 18 to allow fluid to exit pump 10 through pump outlet 16. Because the orientation of the second check valve assembly 18 is reversed from the first check valve assembly 18, first seal 40 of the second check valve assembly 18 contacts the wall of pump outlet bore 24 while second seal 42 of the second check valve assembly 18 contacts pump outlet manifold 26.

During operation of pump 10, pump 10 creates a pressure differential that allows the fluid to push ball 34 and ball guide 36 of the first check valve assembly 18 away from valve seat 32 of the first check valve assembly 18, thereby allowing fluid to both enter pump inlet 14 and traverse the first check valve assembly 18. After the fluid passes through pump 10, pump 10 pushes the fluid into pump outlet 16 and against ball 34 of the second check valve assembly 18. The pressure of the fluid flowing into pump outlet 16 pushes ball 34 and ball guide 36 of the second check valve assembly 18 away from valve seat 32 of the second check valve assembly 18, thereby allowing the fluid to flow across the second check valve assembly 18 and out of pump outlet 16.

In the event that the first or second check valve assembly 18 needs to be disassembled from pump 10 for service or replacement, fasteners 28 can be removed to detach pump inlet manifold 22 and/or pump outlet manifold 26 from fluid cover housing 12 of pump 10. With pump inlet manifold 22 and/or pump outlet manifold 26 removed from fluid cover housing 12, the first and/or second check valve assemblies 18 can be removed from pump 10 by simply pulling the respective housing 30 out of pump inlet bore 20 and/or pump outlet bore 24. To reassemble check valve assembly 18 into pump 10, check valve assembly 10, which is preassembled, is simply inserted into pump inlet bore 20 or pump outlet bore 24 by sliding housing 30 into pump inlet bore 20 or pump outlet bore 24. Pump inlet manifold 22 or pump outlet manifold 26 is then positioned over pump inlet bore 20 or pump outlet bore 24 respectively, and fasteners 28 are employed to connect pump inlet manifold 22 or pump outlet manifold 26 to fluid cover housing 12 and to secure check valve assembly 18 within pump inlet bore 20 or pump outlet bore 24. The inner assembly of check valve assembly 18 is discussed in greater detail below with reference to FIGS. 2 and 3.

Figure 2:
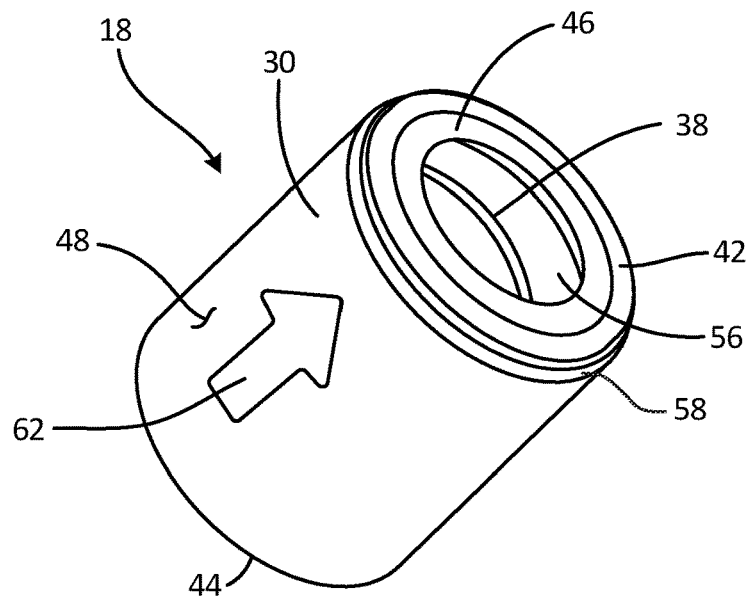
FIG. 2 is a perspective view of the check valve assembly from FIG. 1.
Figure 3:
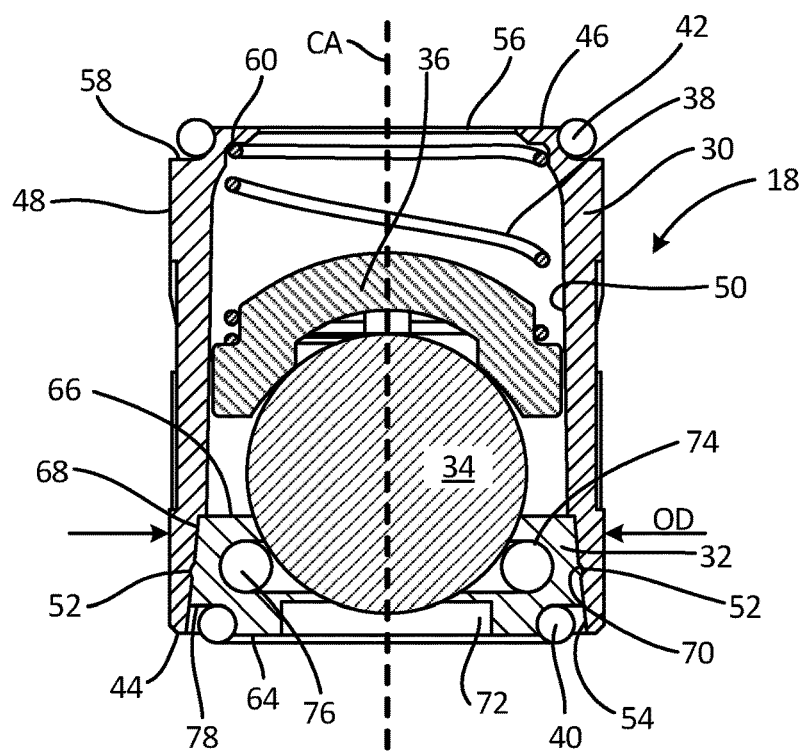
FIG. 3 is a cross-sectional view of the check valve assembly from FIG. 2.

FIGS. 2-3 will be discussed concurrently. FIG. 2 is a perspective view of check valve assembly 18 from FIG. 1. FIG. 3 is a cross-sectional view of check valve assembly 18 from FIG. 2. As shown in FIGS. 2-3, check valve assembly 18 can further include center axis CA. Housing 30 includes first end 44, second end 46, outer surface 48, inner surface 50, annular locking groove 52, opening 54, valve outlet 56, outer diameter OD, second seal seat groove 58, spring seat 60, and flow direction marker 62. Valve seat 32 includes first side 64, second side 66, outer surface 68, annular locking ridge 70, valve inlet 72, annular groove 74, ball seat seal 76, and first seal seat groove 78.

Housing 30 extends axially along center axis CA of check valve assembly 18 from first 44 end to second end 46. As shown in FIGS. 2 and 3, housing 30 is substantially tubular and cylindrical with outer surface 48 having a substantially uniform diameter OD from first end 44 to second end 46 of housing 30. The term "substantially uniform diameter" can be defined for the purposes of this disclosure as a surface having a uniform diameter only interrupted by grooves for seals. Flow direction marker 62, shown in FIG. 2, can be disposed on outer surface 48 and can indicate the direction that fluid should enter check valve assembly 18. For example, direction marker 62 can be an arrow etched or painted onto outer surface 48 and pointing from first end 44 toward second end 46 of housing 30. Inner surface 50 of housing 30 is disposed radially inward of outer surface 48 and extends from first end 44 toward second end 46 of housing 30. Opening 54 is disposed at first end 44 of housing 30 and valve outlet 56 is disposed at second end 46 of housing 30 opposite opening 54. Opening 54 can be larger than valve outlet 56 so as to accommodate valve seat 32.

Valve seat 32 is disposed in opening 54 and is connected to inner surface 50 of housing 30 proximate first end 44 of housing 30. Valve seat 32 can be formed from stainless steel or any other metal or plastic that is corrosion resistant against the fluid flowing though check valve assembly 18. First side 64 of valve seat 32 is disposed axially opposite second side 64 of valve seat 32, with second side 64 of valve seat 32 being disposed inside check valve assembly 18 and facing ball 34 and valve outlet 56. Outer surface 68 of valve seat 32 is a radially outer surface of valve seat 32 that extends between first side 64 and second side 66 of valve seat 32. Outer surface 68 of valve seat 32 tapers radially inward from first side 64 to second side 66 of valve seat 32 to aid the insertion of valve seat 32 into opening 54 of housing 30 during assembly of check valve assembly 18. A portion of inner surface 50 of housing 30 tapers radially inward from first end 44 of housing 30 to second side 66 of valve seat 32 so that the tapered portion inner surface 50 corresponds with outer surface 68 of valve seat 32. Annular locking groove 52 is formed on the tapered portion inner surface 50 of housing 30. Annular locking ridge 70 is formed on outer surface 68 of valve seat 32 and can extend into annular locking groove 52 of housing 30 to connect valve seat 32 to housing 30 in a snap fit connection.

Valve inlet 72 extends axially through first side 64 and second side 66 of valve seat 32 and is centered on center axis CA. Annular groove 74 is formed in valve seat 32 around valve inlet 72. Ball seat seal 76 can be an elastomeric O-ring seal disposed in annular groove 74 and is disposed circumferentially around valve inlet 72. As shown in FIG. 3, annular groove 74 and ball seat seal 76 are positioned axially between first side 64 and second side 66 of valve seat 32. Ball seat seal 76 is the ball seat of check valve assembly 18 and contacts ball 34 during operation when check valve assembly 18 is in a closed positioned to prevent fluid from leaking between ball 34 and valve seat 32. Because ball seat seal 76 is elastomeric, ball seat seal 76 can deform against ball 34 to provide a seal between ball 34 and valve seat 32 that is tighter than the seal found between rigid prior art ball seats and balls. Ball seat seal 76 can be formed from a perfluoro-elastomer material to protect ball seat seal 76 against chemical attack from the fluid that interacts with check valve assembly 18. Ball seat seal 76 can also be formed from any kind of material that is resistant to chemical attack from the fluid and that can form a seal with ball 34. In an alternative embodiment, valve seat 32 can be configured to include a ball seat that is integral with valve seat 32 and formed from valve seat 32.

Ball 34, ball guide 36, and spring 38 are all disposed inside housing 30. As shown best in FIG. 3, spring 38 is disposed axially between valve outlet 56 and ball guide 36 and can be compressed between valve outlet 56 and ball guide 36. Spring 38 is larger in diameter than valve outlet 56 so that spring 38 cannot be pushed out housing 30 through valve outlet 56. Spring seat 60 extends radially inward from inner surface 50 of housing 30 at second end 46 of housing 30 to support and back spring 38. Spring seat 60 can also define valve outlet 56. Ball guide 36 is disposed inside housing 30 and is positioned axially between spring 38 and valve seat 32. Ball 34 is disposed axially between ball guide 36 and valve seat 32. Ball 34 is larger in diameter than valve inlet 72 and ball seat seal 76 so that spring 38 is unable to push ball 34 completely through valve inlet 72. Ball 34 and spring 38 can both be formed from stainless steel so as to resist chemical attack and corrosion from the fluid flowing through check valve assembly 18. Ball guide 36 can be formed from a durable plastic that is also resistant to chemical attack, such as a polyphenylene sulfide plastic material. Ball guide 36 can also be made from metal or any other material that can be formed into the shape of ball guide 36 and that is chemically resistant to the fluid.

When fluid is forced into valve inlet 72 of check valve assembly 18 by a pump, such as pump 10 shown in FIG. 1, the pressure of the fluid can push ball 34 away from ball seat seal 76 and further compress spring 38 between ball guide 36 and spring seat 60. After pushing ball 34 away from ball seat seal 76, the fluid is able to enter housing 30, flow around ball 34, and flow towards valve outlet 56. The fluid then exits housing 30 through valve outlet 56. Should the pressure of the fluid drop below a predetermined value, spring 38 will urge ball 34 against ball seat seal 76 and stop the fluid from entering check valve assembly 18.

Inner surface 50 of housing 30 of check valve assembly 18 provides at least the majority of the flow path for the fluid as the fluid traverses across check valve assembly 18. As shown in FIG. 3, inner surface 50 of housing 30 smoothly transitions and narrows as inner surface 50 extends toward valve outlet 56. Smoothly transitioning inner surface 50 of housing 30 as inner surface 50 extends toward valve outlet 56 can reduce debris and residue buildup within check valve assembly 18 because there are few corners and locations within housing 30 for residue and particulate to lodge and buildup when check valve assembly is flushed. Prior art check valve assemblies relied on the pump housing and/or pump manifolds to form the flow path across prior art check valve assemblies. Pump housings and pump manifolds are much larger parts than housing 30 of check valve assembly 18 and formed from materials that are relatively difficult to tailor and manipulate to form a smooth flow path across a check valve assembly. On the contrary, housing 30 can be manufactured through a molding process to create the smooth transition of inner surface 50 of housing 30. Housing 30 can be molded from a durable plastic that is also resistant to chemical attack, such as a polyphenylene sulfide plastic material. Housing 30 can also be made from metal or any other material that can be formed into the shape of housing 30 and that is chemically resistant to the fluid.

First seal 40 is disposed on first side 64 of valve seat 32. First seal 40 can be an O-ring seal that extends circumferentially around valve inlet 72 and that is spaced radially between valve inlet 72 and housing 30. As shown in FIG. 3, first seal seat groove 78 can be formed in first side 64 of valve seat 32 to receive and accommodate first seal 40. First seal seat groove 78 is spaced radially from valve inlet 72 relative center axis CA and extends circumferentially around valve inlet 72. First seal seat groove 78 extends radially and intersect outer surface 68 of valve seat 32 to provide space for first seal 40 to compress and deform when check valve assembly 18 is assembled into pump 10 as shown in FIG. 1.

Second seal 42 is disposed on second end 46 of housing 30 and disposed circumferentially around valve outlet 56. Second seal 42 can be an O-ring with an outer diameter that is equal to or less than the outer diameter OD of housing 30 and larger in diameter than valve outlet 56. Second seal seat groove 58 is formed in housing 30 at second end 46 of housing 30 to receive and accommodate first seal 40. Second seal seat groove 58 is spaced radially from valve outlet 56 relative center axis CA and extends circumferentially around valve outlet 56. Housing 30 can include a uniform outer diameter OD from first end 44 of housing 30 to second seal 42. Because housing 30 can include a uniform diameter from first end 44 to second seal 42, and because second seal 42 can have an outer diameter that is equal to or less than the outer diameter OD of housing 30, check valve assembly 18 can be axially reversed depending on whether check valve assembly 18 is being used in pump inlet 14 or pump outlet 16.

As previously discussed with reference to FIG. 1, first seal 40 and second seal 42 together prevent fluid from flowing around and bypassing check valve assembly 18. Because first seal 40 and second seal 42 are disposed outside of the fluid path created by inner surface 50 of housing 30 and valve inlet 72 of valve seat 32, first seal 40 and second seal 42 do not interfere with the removal of residue and debris inside the flowpath of check valve assembly 18 when check valve assembly 18 is flushed by water or another solvent.

In view of the foregoing description, it will be recognized that the present disclosure provides numerous advantages and benefits. For example, the present disclosure provides check valve assembly 18 with housing 30 and valve seat 32. Together, housing 30 and valve seat 32 contain all of the components of check valve assembly 18 into a single preassembled capsule that is relatively easy to assemble into pump 10 or remove from pump 10 in the event of maintenance or replacement. Housing 30 includes an outer diameter OD that is substantially uniform, thereby allowing check valve assembly 18 to be used in either pump inlet 14 or pump outlet 16 simply by rotating check valve assembly 18. Housing 30 and valve seat 32 also form a fluid path across check valve assembly 18 that transitions smoothly from valve inlet 72 to valve outlet 56, thus allowing easy flushing of residue and debris out of check valve assembly 18.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A check valve assembly comprises:
   a housing extending axially along a center axis of the check valve assembly from a first end to a second end, wherein the housing comprises:
      an opening disposed at the first end
      an outlet disposed at the second end and axially aligned with the opening;
      an inner surface extending from the first end toward the second end of the tubular housing; and
      an annular locking groove formed on the inner surface;
   a seat disposed in the opening and connected to the housing, wherein the seat is positioned axially at the first end of the housing, and wherein the seat comprises:
      an inlet extending axially through the seat;
      a first side disposed axially opposite a second side, wherein the inlet extends through the first side and the second side, and wherein the second side faces the outlet;
      an outer surface contacting an inner surface of the housing, the outer surface tapering radially inward from the first side of the seat to the second side of the seat; and
      an annular locking ridge formed on the tapered outer surface of the seat and that extends into the annular locking groove of the housing;
   a ball disposed inside the housing and disposed axially between the seat and the outlet, wherein the ball is larger in diameter than the inlet;
   a ball guide disposed inside the housing and disposed axially between the ball and the outlet; and
   a spring disposed inside the housing and disposed axially between the ball guide and the outlet, wherein the spring is compressed between the ball guide and the outlet.

2. The assembly of claim 1, wherein the housing is tubular and comprises a substantially uniform outer diameter from the first end to the second end of the tubular housing.

3. The assembly of claim 2, wherein the seat further comprises:
   an annular groove formed in the seat around the inlet; and
   a ball seat seal disposed in the annular groove and disposed circumferentially around the inlet.

4. The assembly of claim 3, wherein the ball seat seal is an O-ring seal comprising a perfluoro-elastomer.

5. The assembly of claim 4, wherein the seat further comprises:
   a first seal seat groove is formed in the first side of the seat, wherein the first seal seat groove is spaced radially from the inlet relative the center axis and extends circumferentially around the inlet.

6. The assembly of claim 5 further comprising:
   a first seal disposed in the first seal seat groove.

7. The assembly of claim 6, wherein the tubular housing further comprises:
   a second seal seat groove formed in the tubular housing at the second end of the tubular housing, wherein the second seal seat groove is spaced radially from the outlet relative the center axis and extends circumferentially around the outlet.

8. The assembly of claim 7 further comprising:
   a second seal disposed in the second seal seat groove.

9. The assembly of claim 8, wherein the outlet is smaller in diameter than the opening.

10. A check valve assembly comprises:
   a tubular housing extending axially along a center axis of the check valve assembly from a first end to a second end, wherein the tubular housing comprises:
      a substantially uniform outer diameter from the first end to the second end of the tubular housing;
      an opening disposed at the first end
      an outlet disposed at the second end and axially aligned with the opening, wherein the outlet is smaller in diameter than the opening;
      an inner surface extending from the first end toward the second end of the tubular housing; and
      an annular locking groove formed on the inner surface;

a seat disposed in the opening and connected to the tubular housing, wherein the seat is positioned axially at the first end of the tubular housing, and wherein the seat comprises:
an inlet extending axially through the seat;
a first side disposed axially opposite a second side, wherein the inlet extends through the first side and the second side, and wherein the second side faces the outlet;
an outer surface contacting an inner surface of the tubular housing, the outer surface tapering radially inward from the first side of the seat to the second side of the seat; and
an annular locking ridge formed on the tapered outer surface of the seat and that extends into the annular locking groove of the tubular housing;
a ball disposed inside the tubular housing and disposed axially between the seat and the outlet, wherein the ball is larger in diameter than the inlet; and
a spring disposed inside the tubular housing and disposed axially between the ball and the outlet.

11. The assembly of claim 10 further comprising:
a ball guide disposed inside the tubular housing and disposed axially between the ball and the spring.

12. The assembly of claim 11, wherein the seat further comprises:
a first seal disposed on the first side of the seat.

13. The assembly of claim 12, wherein the first seal is an O-ring seal that extends circumferentially around the inlet and that is spaced radially between the inlet and the tubular housing.

14. The assembly of claim 13 further comprising:
a second seal disposed on the second end of the tubular housing and disposed circumferentially around the outlet.

15. The assembly of claim 14, wherein the seat comprises an elastomeric O-ring seal positioned axially between the first side and the second side of the seat.

16. A check valve assembly comprises:
a tubular housing extending axially along a center axis of the check valve assembly from a first end to a second end, wherein the tubular housing comprises:
an opening disposed at the first end; and
an outlet disposed at the second end and axially aligned with the opening;
an inner surface extending from the first end toward the second end of the tubular housing; and
an annular locking groove formed on the inner surface;
a seat disposed in the opening and connected to the tubular housing, wherein the seat is positioned axially at the first end of the tubular housing, and wherein the seat comprises:
an inlet extending axially through the seat;
a first side disposed axially opposite a second side, wherein the inlet extends through the first side and the second side, and wherein the second side faces the outlet;
an outer surface contacting an inner surface of the tubular housing, the outer surface tapering radially inward from the first side of the seat to the second side of the seat; and
an annular locking ridge formed on the tapered outer surface of the seat and that extends into the annular locking groove of the tubular housing;
a ball disposed inside the tubular housing and disposed axially between the second side of the seat and the outlet, wherein the ball is larger in diameter than the inlet;
a ball guide disposed inside the tubular housing and disposed axially between the ball and the outlet;
a spring disposed inside the tubular housing and disposed axially between the ball guide and the outlet, wherein the spring is compressed between the ball guide and the outlet;
a first seal disposed on the first side of the seat; and
a second seal disposed on the second end of the tubular housing,
wherein the tubular housing comprises a uniform outer diameter from the first end of the tubular housing to the second seal.

17. The assembly of claim 16, wherein the second seal is an O-ring with an outer diameter that is equal to or less than the outer diameter of the tubular housing and larger than the outlet.

* * * * *